March 6, 1951     N. WYETH     2,544,548
SHOCK ABSORBER
Filed Nov. 20, 1947
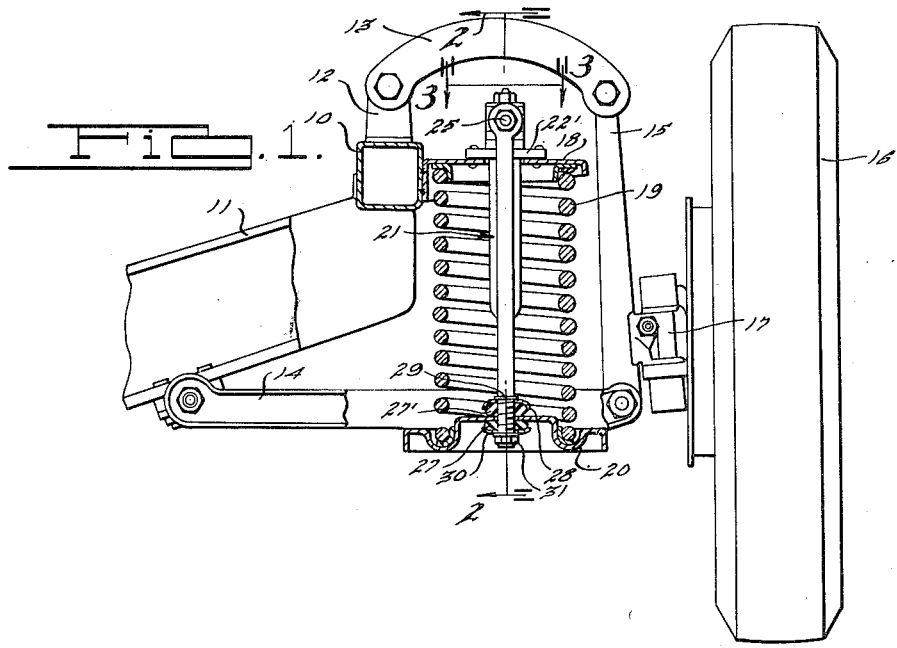
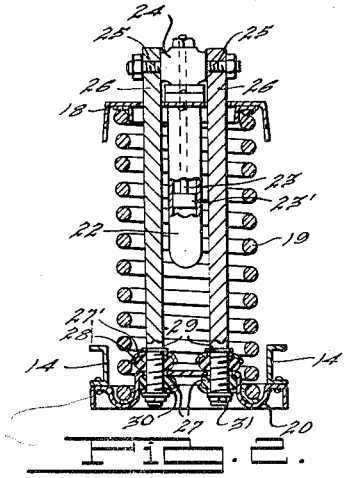
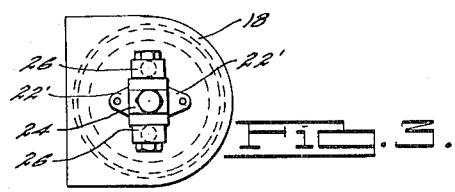
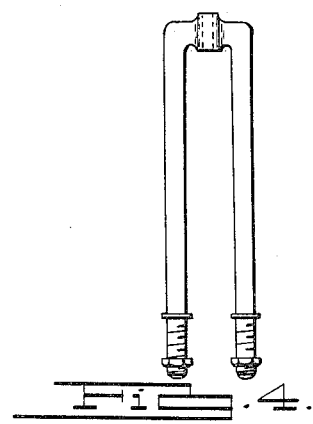
INVENTOR.
Nathaniel Wyeth.
BY
Harness and Harris
ATTORNEYS.

Patented Mar. 6, 1951

2,544,548

UNITED STATES PATENT OFFICE 2,544,548

SHOCK ABSORBER

Nathaniel Wyeth, Detroit, Mich., assignor to Chrysler Corporation, Highland Park, Mich. a corporation of Delaware Application November 20, 1947, Serial No. 787,093

4 Claims. (Cl. 267—8)

My invention relates to motor vehicles and more particularly to shock absorber assemblies on motor vehicles.

In the past the shock absorber has been mounted at its reservoir end on the unsprung, movable members of the wheel suspension of a motor vehicle. When the shock absorber is mounted in this manner, the liquid medium in the lower portion of the reservoir was excessively mixed or churned with the air in the upper portion of the reservoir when excessive vertical motion of the wheel occurred producing a mixture of air and liquid, such as oil. Under these conditions the shock absorber does not operate satisfactorily because the air of the mixture is compressible by the piston of the shock and the piston is moved quickly toward its lower position thus defeating the purpose of the shock absorber. The same action takes place upon opposite movement of the piston of a double acting shock absorber when the latter is so mounted that its fluid is mixed with air due to excessive vibratory movement.

The principal object of my invention is to provide a motor vehicle with a shock absorber which has a fluid reservoir mounted directly on the spring portion of the vehicle thereby greatly reducing the vertical and other motion of the fluid reservoir.

Another object of my invention is to provide a motor vehicle with a shock absorber which is mounted in close proximity to the resilient means of the wheel suspension thereby presenting a compact structure.

A further object of my invention is to provide a motor vehicle with a shock absorber which is readily mounted on the sprung portion of the whel suspension system thereby reducing the cost of manufacture.

Still another object of my invention is to provide a motor vehicle with a shock absorber which is partially mounted within the coil spring of the suspension system of the vehicle thereby utilizing the space within the spring and thus protecting a large portion of the shock absorber from stones and the like.

Other objects and advantages will become more apparent from the following description taken in connection with the accompanying drawings in which:

Fig. 1 is an elevational view of a wheel suspension system embodying my invention;

Fig. 2 is a sectional view taken on the line 2—2 of Fig. 1;

Fig. 3 is a plan view of the portion of the suspension system embodying my invention taken on the line 3—3 of Fig. 1;

Fig. 4 is an elevational view of a modified form of the shafts and collar assembly shown in Figs. 1, 2 and 3.

Referring now to the drawings, I have shown a motor vehicle frame 10 having a cross member 11. The frame 10 is of the conventional construction having a pair of upwardly extending brackets 12 for pivotally receiving one extremity of an upper control arm 13. The cross member 11 has pivotally mounted on its underside one extremity of lower control arm 14. The upper control arm 13 and the lower control arm 14 are pivotally connected at their other extremities by an upright knuckle bracket 15 which has a motor vehicle wheel 16 mounted thereon by means of a kingpin and spindle assembly 17. The frame 10 has an upper plate 18 welded thereto for receiving and positioning the upper extremity of a coil spring 19. The lower extremity of the spring 19 is seated in a lower plate 20 which is welded to the lower control arm 14. By positioning the spring in this manner, the wheel is suspended from the frame and cross member assembly since one extremity of the spring is mounted on the frame and the other extremity of the spring is mounted on the lower control arm which is pivoted to the cross member. It would then be proper to refer to the frame 10 and cross member 11 as the sprung portion of a wheel suspension system and the remaining mechanism comprising the upper and lower control arms 13 and 14, the upright knuckle bracket 15 the kingpin and spindle assembly 17 and the wheel 16 as the unsprung portion of the wheel suspension system.

A shock absorber, generally designated by the numeral 21 of the conventional type having a casing 22 forming a reservoir for fluid medium such as oil, is mounted on the upper plate 18 by a bracket 22′ which is secured to the casing or relatively stationary portion of the shock absorber. A piston rod 23 extends into the casing 22 and has a piston 23′ on its lower end. The upper end of the piston rod 23 is threaded in an aperture of a collar 24 which has a pair of threaded studs 25 extending outwardly in opposite directions therefrom. The studs 25 are adapted to be received in apertures formed in one extremity of a pair of rods 26 which extend downwardly from the collar 24 to the lower plate 20. The other extremities of the rods 26 are yieldably connected to the lower plate 20 by washers 27 and 27′ comprising rubber or synthetic rubberlike material.

The upper washer 27' is positioned between the lower plate 20 and an upper yoke-shaped member 28, the latter being prevented from upward movement by the shoulder 29 formed in the rod 26. The lower washer 27 is positioned between the lower plate 20 and a lower yoke-shaped member 30, the latter being held in position by a nut 31 threaded on the lower extremity of the rod 26. These washers must be so constructed and positioned to allow a predetermined amount of movement of the shafts 26 relative to the lower plate 20. This movement is necessary because the angle of juncture of the shafts and the lower plate is slightly changed when the lower control arm is pivoted. By utilizing the yieldable qualities of the washers the shafts are allowed this movement while being securely retained to the lower plate.

In Fig. 4 I have shown a modification of the collar 24 and rods 25 in which these parts of the structure are formed of one continuous and integral piece of metal. This construction is advantageous in that it is inexpensive to manufacture.

As more clearly seen in Fig. 2, both the rods 25 and the shock absorber 21 are positioned within the coil spring 19. By so positioning these elements a more compact structure is obtained and the main portions of the shock absorber are protected by the spring from injury by stones and other objects. Also by mounting the shock absorber in this fashion, the cost of manufacture is greatly reduced because the same parts are used to mount the coil spring 19, as are also used to mount the shock absorber and rods.

During motion of a motor vehicle, the wheel is continually moved or vibrated in a vertical direction relative to the frame as the wheel encounters road irregularities. As this occurs, the lower control arm 14 pivots about its connection with the cross member 11, thereby causing the shafts 25 to actuate the piston rod 23 inwardly and outwardly of the shock absorber. In the suspension system as heretofore described, it may be readily seen that the frame and cross member assembly has comparatively little vertical motion as compared to the vertical motion of the wheel, therefore, since the reservoir section of the shock absorber is mounted on this sprung portion, the medium therein will remain in a comparatively unmixed or unchurned state.

Although but several embodiments of the invention are herein shown and described, it will be understood that various changes in the details of construction and materials employed may be made without departing from the spirit of the invention.

I claim:

1. In a motor vehicle having a frame means, a suspension assembly comprising upper and lower members pivotally mounted on said frame means, a projection secured to said frame means and extending outwardly therefrom, a coil spring operatively disposed between said projection and said lower member, a hydraulic shock absorber having a reservoir portion and a piston rod extending out of said reservoir portion, said reservoir portion being secured to said projection and depending within said coil spring, a pair of rods disposed within said spring and secured between said piston rod and said lower member, and means associated with said pair of rods for accommodating movement thereof relative to said lower member.

2. In a motor vehicle having a frame means, a suspension assembly comprising upper and lower members pivotally mounted on said frame means, a projection secured to said frame means and extending outwardly therefrom, a coil spring operatively disposed between said projection and said lower member, a hydraulic shock absorber having a reservoir portion and a piston rod extending out of said reservoir portion, said reservoir portion being secured to said projection and depending within said coil spring, a pair of rods disposed within said spring and secured between said piston rod and said lower member, and means associated with said pair of rods for accommodating tilting movement thereof relative to said frame means.

3. In a vehicle including a sprung portion and an unsprung portion, a suspension system connected between said portions comprising upper and lower control arms pivotally connecting said sprung and unsprung portions, a plate secured to said sprung portion and extending outwardly therefrom, a coil spring disposed between said plate and said lower control arm, a hydraulic shock absorber having a reservoir portion secured to said plate, said absorber having an actuating rod extending outwardly thereof above said plate, a collar secured to said actuating rod and having projections extending outwardly therefrom, a pair of rods extending through said coil spring and connected between projections on said collar and said lower control arm, and means associated with said last mentioned pair of rods for accommodating tilting movement thereof relative to said sprung portion.

4. In a vehicle including a sprung portion and an unsprung portion, a suspension system connected between said portions comprising upper and lower control arms pivotally connecting said sprung and unsprung portions, a plate secured to said sprung portion and extending outwardly therefrom, a coil spring disposed between said plate and said lower control arm, a hydraulic shock absorber having a reservoir portion secured to said plate, said absorber having an actuating rod extending outwardly thereof above said plate, a collar secured to said actuating rod and having projections extending outwardly therefrom, a pair of rods extending through said coil spring and connected between the projections on said collar and said lower control arm, and yieldable means associated with said last mentioned pair of rods for accommodating movement thereof relative to said lower control arm.

NATHANIEL WYETH.

REFERENCES CITED

The following references are of record in the file of this patent:

UNITED STATES PATENTS

| Number | Name | Date |
|---|---|---|
| 844,884 | Mans | Feb. 19, 1907 |
| 1,118,818 | Sherman | Nov. 24, 1914 |
| 1,737,328 | Parisi | Nov. 26, 1929 |
| 1,866,167 | Lolley | July 5, 1932 |
| 1,992,526 | Funston | Feb. 26, 1935 |
| 2,321,832 | Leighton | June 15, 1943 |
| 2,338,478 | Wulff | Jan. 4, 1944 |

FOREIGN PATENTS

| Number | Country | Date |
|---|---|---|
| 646,446 | Germany | June 14, 1937 |